US 9,341,108 B2

(12) United States Patent  (10) Patent No.: US 9,341,108 B2
Hattori  (45) Date of Patent: May 17, 2016

(54) VORTEX GENERATOR DEVICE

(71) Applicant: DENSO CORPORATION, Kariya, Aichi-pref. (JP)

(72) Inventor: Hiroaki Hattori, Gifu (JP)

(73) Assignee: DENSO CORPORATION, Kariya (JP)

( * ) Notice: Subject to any disclaimer, the term of this patent is extended or adjusted under 35 U.S.C. 154(b) by 392 days.

(21) Appl. No.: 14/032,234

(22) Filed: Sep. 20, 2013

(65) Prior Publication Data

US 2014/0174401 A1 Jun. 26, 2014

(30) Foreign Application Priority Data

Dec. 20, 2012 (JP) .................................. 2012-277563

(51) Int. Cl.
*F02B 31/00* (2006.01)
*F02B 31/06* (2006.01)
*F02D 9/10* (2006.01)

(52) U.S. Cl.
CPC . *F02B 31/06* (2013.01); *F02D 9/10* (2013.01); *Y02T 10/146* (2013.01)

(58) Field of Classification Search
CPC ............ F02B 31/00; F02B 31/06; F02D 9/10; Y02T 10/146
See application file for complete search history.

(56) References Cited

U.S. PATENT DOCUMENTS

2009/0293838 A1* 12/2009 Konakawa ............. F02B 31/06
123/306

FOREIGN PATENT DOCUMENTS

| JP | 57065815 A | * | 4/1982 | ............. F02B 31/00 |
| JP | 2001-248450 A | | 9/2001 | |
| JP | 2006-316737 A | | 11/2006 | |
| JP | 2009-275603 A | | 11/2009 | |
| JP | 2009-293388 A | | 12/2009 | |
| JP | 2010-190166 A | | 9/2010 | |

OTHER PUBLICATIONS

Office Action issued Dec. 2, 2014 in corresponding JP Application No. 2012-277563 (with English translation).

* cited by examiner

*Primary Examiner* — Hieu T Vo

(57) ABSTRACT

A plate-shaped butterfly valve is rotatable to throttle intake airflow, which is to be drawn into an internal combustion engine, and to direct the intake airflow toward a specific periphery in a cross section of a passage. The passage has a passage wall defining a passage wall step. The passage wall step is located on the downstream side from a rotation locus of the butterfly valve relative to intake airflow. The passage wall step has a raised side and a depressed side, which are located on the downstream side and on the upstream side, respectively, relative to intake airflow.

6 Claims, 9 Drawing Sheets

VORTEX GENERATOR DEVICE

CROSS REFERENCE TO RELATED APPLICATION

This application is based on reference Japanese Patent Application No. 2012-277563 filed on Dec. 20, 2012, the disclosure of which is incorporated herein by reference.

TECHNICAL FIELD

The present disclosure relates to a vortex generator device configured to generate a vortex flow, such as a tumble flow and a swirl flow in, for example, a combustion chamber of an internal combustion engine.

BACKGROUND

For example, Patent Documents 1 and 2 disclose conventional vortex generator devices each including a butterfly valve, which is in a plate shape and rotated in a passage through which intake air flows. The conventional vortex generator device causes the butterfly valve to rotate to throttle intake airflow and to concentrate the intake airflow toward a specific periphery in a cross section of the passage. Such a conventional vortex generator device is conceived not to cause a flow other than a concentrated flow, which is concentrated to the specific periphery, thereby to restrict the concentrated flow from decreasing in flow velocity and to restrict the concentrated flow from diffusing.

When the butterfly valve is at the full-close angle, the butterfly valve throttles intake airflow most to concentrate the intake airflow toward the specific periphery. In addition, when the butterfly valve is at the full-close angle, a clearance (full-close CL) is formed between the perimeter of the butterfly valve and a passage wall of the passage other than the specific periphery of the passage. In order not to cause a flow other than the concentrated flow, the clearance (full-close CL) is required to be substantially zero, as much as possible, when the butterfly valve is at the full-close angle. It is further noted that, in order to reduce the clearance (full-close CL) to substantially zero as much as possible, it is required to employ an elastic material to form the perimeter of the valve element or it is required to enhance accuracy of components. Consequently, manufacturing cost for the valve element and/or the components may increase.

In Patent Document 2, a partition plate is equipped on the downstream side relative to a rotation locus of the butterfly valve, thereby to restrict the concentrated flow from diffusing. Nevertheless, even the configuration of Patent Document 2 may still generate a flow other than the concentrated flow. Consequently, in the configuration of Patent Document 2, a flow velocity of the concentrated flow may decrease, and a vortex may not be generated desirably.

(Patent Document 1)
Publication of Unexamined Japanese Patent Application No. 2001-248450
(Patent Document 2)
Publication of Unexamined Japanese Patent Application No. 2010-190166

SUMMARY

It is an object of the present disclosure to produce a vortex generator device configured to restrict a flow velocity of a concentrated flow therein from decreasing and to restrict the concentrated flow from diffusing thereby to enable generation of a vortex flow desirably.

According to an aspect of the present disclosure, a vortex generator device comprises a butterfly valve in a plate shape. The butterfly valve is configured to rotate to throttle an intake airflow, which is to be drawn into an internal combustion engine, toward a specific periphery in a passage cross section. The vortex generator device further comprises a passage wall step formed in a passage wall, which defines a passage of intake air. The passage wall step is located on a downstream side from a rotation locus of the butterfly valve relative to intake airflow. The passage wall step has a raised side and a depressed side, which are located on a downstream side and on an upstream side, respectively, relative to intake airflow.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION

As follows, swirl emitting devices according to embodiments will be described.

Figure 1:
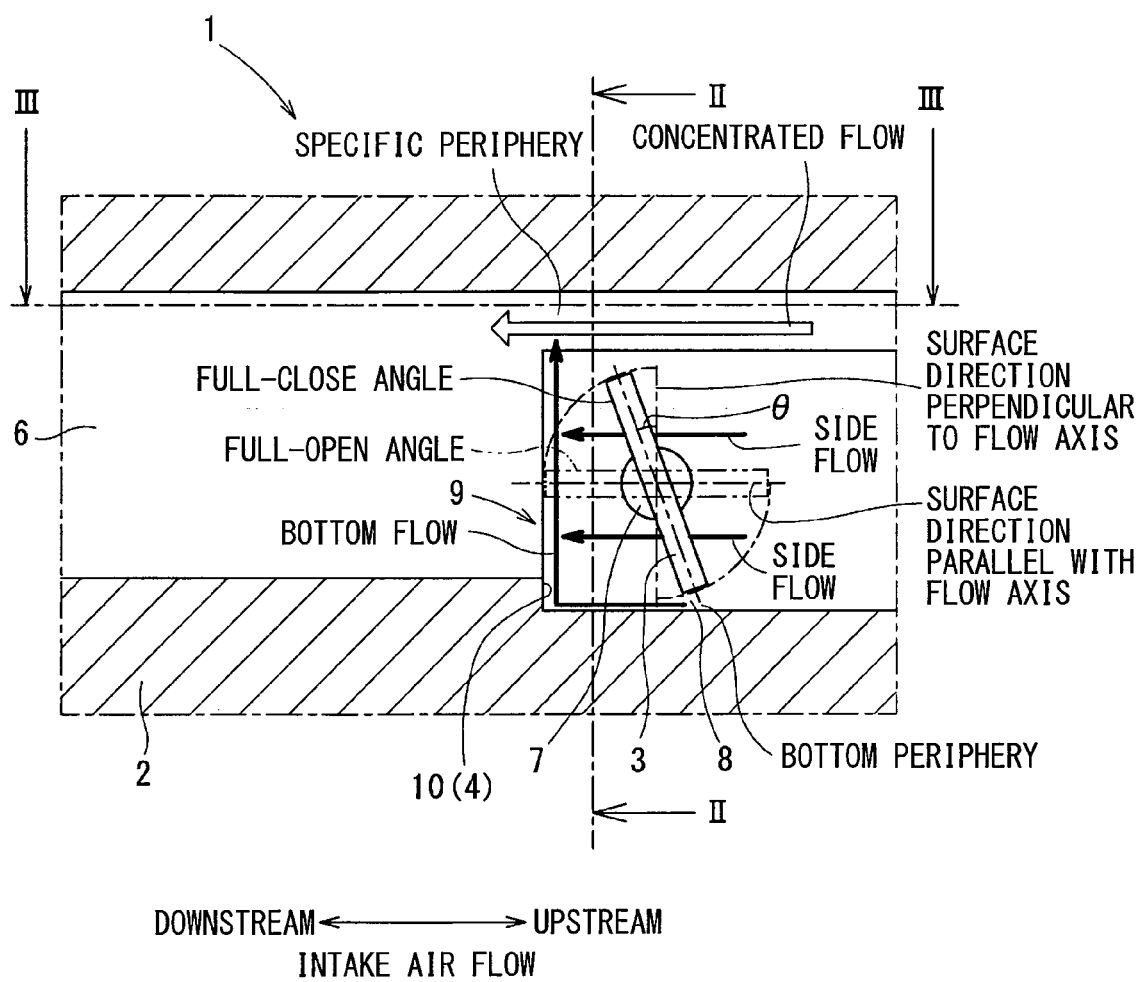
FIG. 1 is a schematic view showing a vortex generator device according to a first embodiment.
Figure 2:
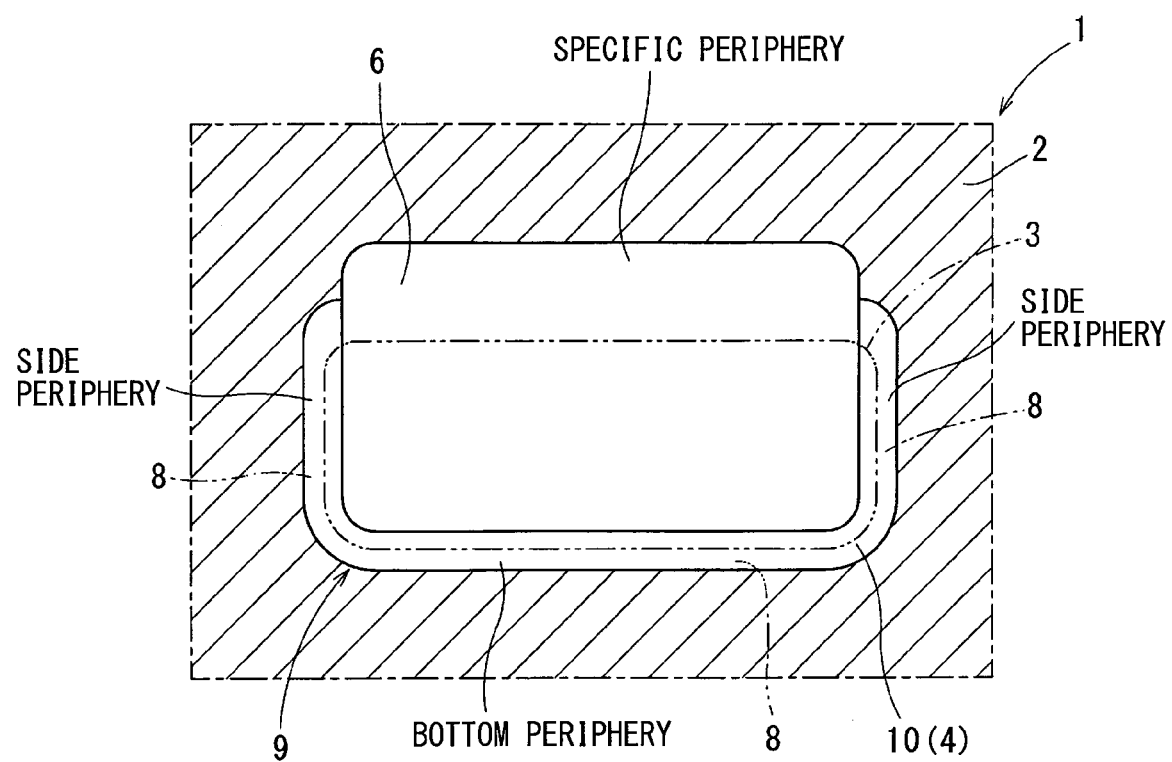
FIG. 2 is a sectional view taken along the line II-II in FIG. 1, according to the first embodiment.
Figure 3:
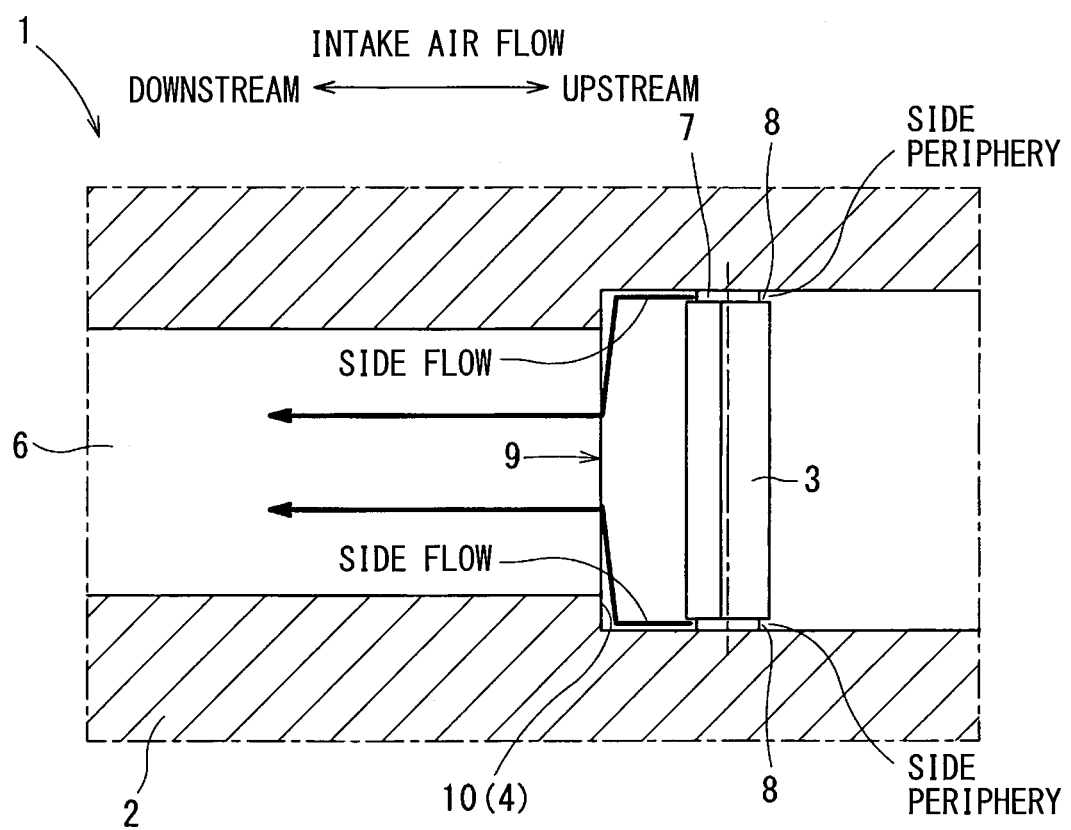
FIG. 3 is a sectional view taken along the line III-III in FIG. 1, according to the first embodiment.

Embodiment (Configuration of First Embodiment)
As follows, a configuration of a vortex generator device 1 according to a first embodiment will be described with reference to FIGS. 1 to 3. The vortex generator device 1 is configured to generate, for example, a timbre style and/or a swirl flow in a combustion chamber of an internal combustion engine (none shown). The vortex generator device 1 is equipped to, for example, an inside of branch pipes 2 of an intake manifold, which is located on a directly upstream side of the combustion chamber.

The vortex generator device 1 includes, as primal elements, a butterfly valve 3 and a passage wall step 4, as described below. The butterfly valve 3 is in a plate shape and is rotated to throttle the flow of intake air (intake airflow), which is to be drawn into the internal combustion engine, into a specific periphery in a cross section of each of passages 6 in branch pipes 2. The butterfly valve 3 functions as valve elements 3.

The valve element 3 throttles and concentrates the flow of intake air into the specific periphery, thereby to cause a concentrated flow, which is inclined to the specific periphery. Thus, the concentrated flow is drawn into the combustion chamber thereby to generate a tumble flow and/or a swirl flow.

The valve elements 3 are located in the branch pipes 2, respectively. A single rotation axis 7 is equipped to pass through the branch pipes 2 along a direction in which the branch pipes 2 are arranged. The rotation axis 7 is in common among the valve elements 3. The rotation axis 7 is rotated by an actuator (not shown), which is equipped to an end of the branch pipes 2 in the direction in which the branch pipes 2 are arranged. The actuator generates a torque to drive the rotation axis 7. The actuator employs an electric motor and/or a negative-pressure driven configuration. In a case where the actuator employs a negative-pressure driven configuration, the actuator may utilize a negative pressure caused by suction of intake air into the combustion chamber. Each of the valve elements 3 is in a rectangular shape. The rotation axis 7 is integrated with the valve elements 3 and is in parallel with a longitudinal side of the rectangular shape of each valve element 3.

The valve element 3 is rotated at one of a full-close angle and a full-open angle. At the full-close angle, the valve element 3 throttles flow of intake air most into the specific periphery. At the full-open angle, the valve element 3 throttles flow of intake air least. The full-close angle is a rotation angle of the valve element 3 when the valve element 3 causes the concentrated flow. The full-close angle is, for example, an angle theta by which the valve element 3 is inclined. When the valve element 3 is at the full-close angle, for example, a perimeter of the valve element 3, which is on the side of the specific periphery, is projected toward the downstream side relative to a surface direction, which is perpendicular to an axis of the passage 6 (passage axis). The full-open angle is a rotation angle of the valve element 3 when the valve element 3 does not cause the concentrated flow. When the valve element 3 is at the full-open angle, for example, the valve element 3 is directed along a surface direction, which is in parallel with the passage axis.

When the valve element 3 is at the full-close angle, the perimeter of the valve element 3 and a wall of the passage 6 (passage wall) form a clearance (full-close CL) therebetween, around a periphery in the cross section of the passage 6 other than the specific periphery. Intake air leaks through the full-close CL 8 to cause a bottom flow and a side flow, which are other than the concentrated flow.

The bottom flow leaks around a periphery (bottom periphery) on the opposite side from the specific periphery across the passage axis. Than is, the bottom periphery may be opposed to the specific periphery across the valve element 3. The side flow leaks around a periphery (side periphery) other than the specific periphery and the bottom periphery. The side periphery exists at two locations on both ends of each of the specific periphery and the bottom periphery. Therefore, the side flow is formed around both ends of each of the concentrated flow and the bottom flow.

The passage wall step 4 formed in the passage wall is related with the flow of an intake air on the downstream side relative to a rotation locus of the valve element 3. The passage wall step 4 has a raised side and a depressed side, which are located on the downstream side and the upstream side, respectively, relative to the intake airflow. The rotation locus of the valve element 3 is formed by the valve element 3 moving back and forth in an angular range (π/2-theta) between the full-open angle and the full-close angle.

The passage wall step 4 is formed to extend continually through the bottom periphery and the two side peripheries to form an annular portion 9, which surrounds the passage axis. As show in FIG. 2, when viewed in a cross section taken along perpendicularly to the passage axis, the annular portion 9 is in a U-shape surrounding the passage axis. As show in FIG. 1, when viewed in a cross section taken along the passage axis, the annular portion 9 is one line segment perpendicular to the passage axis. In the following description, viewing in the cross section taken along the passage axis is represented by "side-viewing", and viewed in the cross section taken along the passage axis is represented by "side-viewed." The passage wall step 4 forms a stepped surface 10, which is a flat surface perpendicular to the passage axis, in an entire region in the annular portion 9.

(Operation Effect of First Embodiment)

According to the first embodiment, the vortex generator device 1 has a passage wall step 4. The passage wall step 4 is formed on the downstream side from the rotation locus of the valve element 3 relative to intake airflow. The passage wall step 4 has the raised side and the depressed side, which are located on the downstream side and located on the upstream side, respectively, relative to intake airflow. In the present configuration, the bottom flow and the side flows, which are other than the concentrated flow, pass through the full-close CL 8 to the downstream side from the valve element 3 and collides against the stepped surface 10 to be deflected. Thus, the deflected bottom flow and side flows pass around the bottom periphery and side peripheries of the passage 6 toward the center of the passage 6.

The bottom flow merges with the concentrated flow, while drawing the side flows. In this way, intake airflow is converged into the concentrated flow on the downstream side from the valve element 3. Even in the present configuration of the vortex generator device 1 having the full-close CL 8, decrease in flow velocity of the concentrated flow and diffusion of the concentrated flow can be suppressed, and an ideal swirl can be generated.

Second Embodiment

Figure 4:
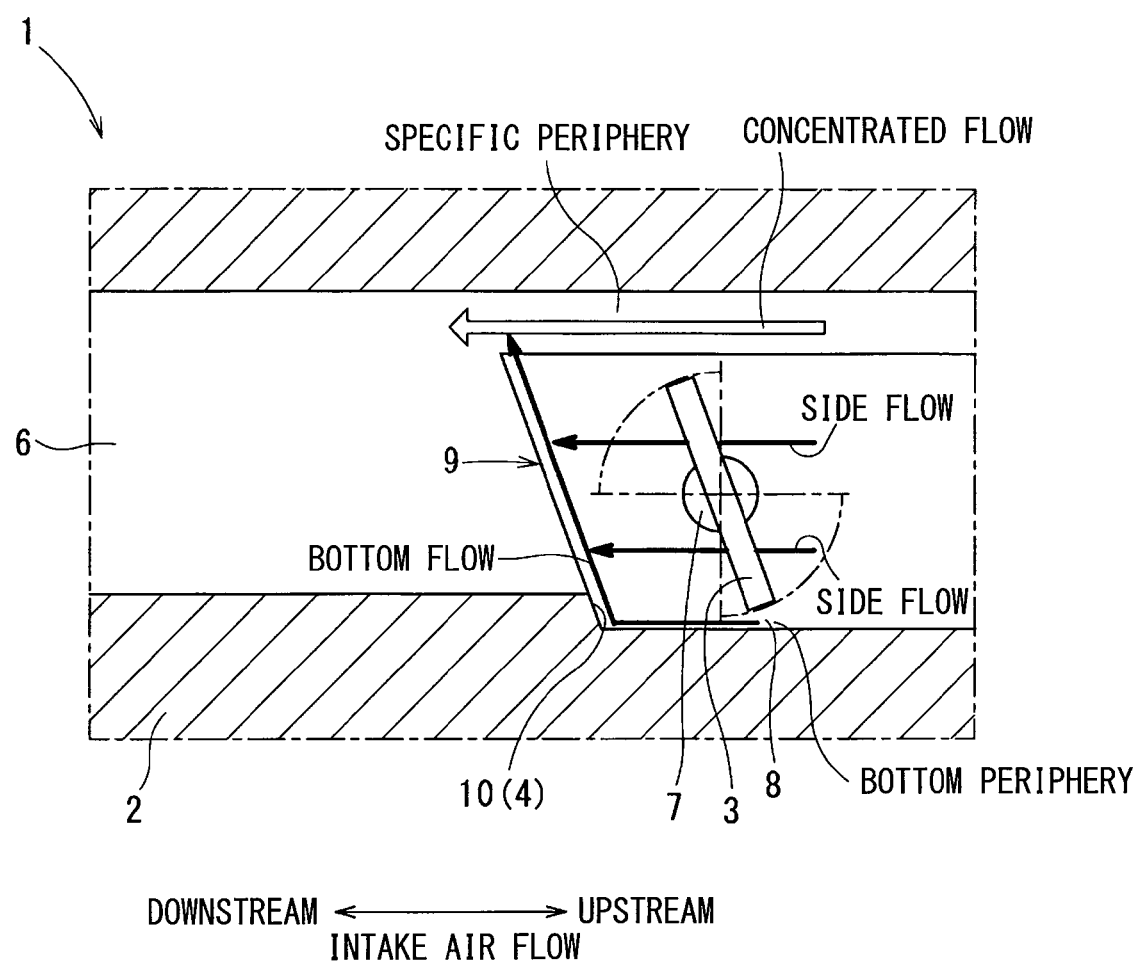
FIG. 4 is a schematic view showing a vortex generator device according to a second embodiment.

As shown in FIG. 4, in the vortex generator device 1 according to the second embodiment, when the valve element 3 is at the full-close angle, the annular portion 9 is substantially in parallel with the direction of the surface of the valve element 3. That is, when being side-viewed, the annular portion 9 is seen as one line segment, which is in parallel with the valve element 3 at the full-close angle. Furthermore, the stepped surface 10 is a flat surface, which is in parallel with the valve element 3 at the full-close angle, through the entire region of the annular portion 9. The present configuration inclines the side flows to move toward the concentrated flow. Therefore, the present configuration enables further easily to converge intake airflow into the concentrated flow.

Third Embodiment

Figure 5:
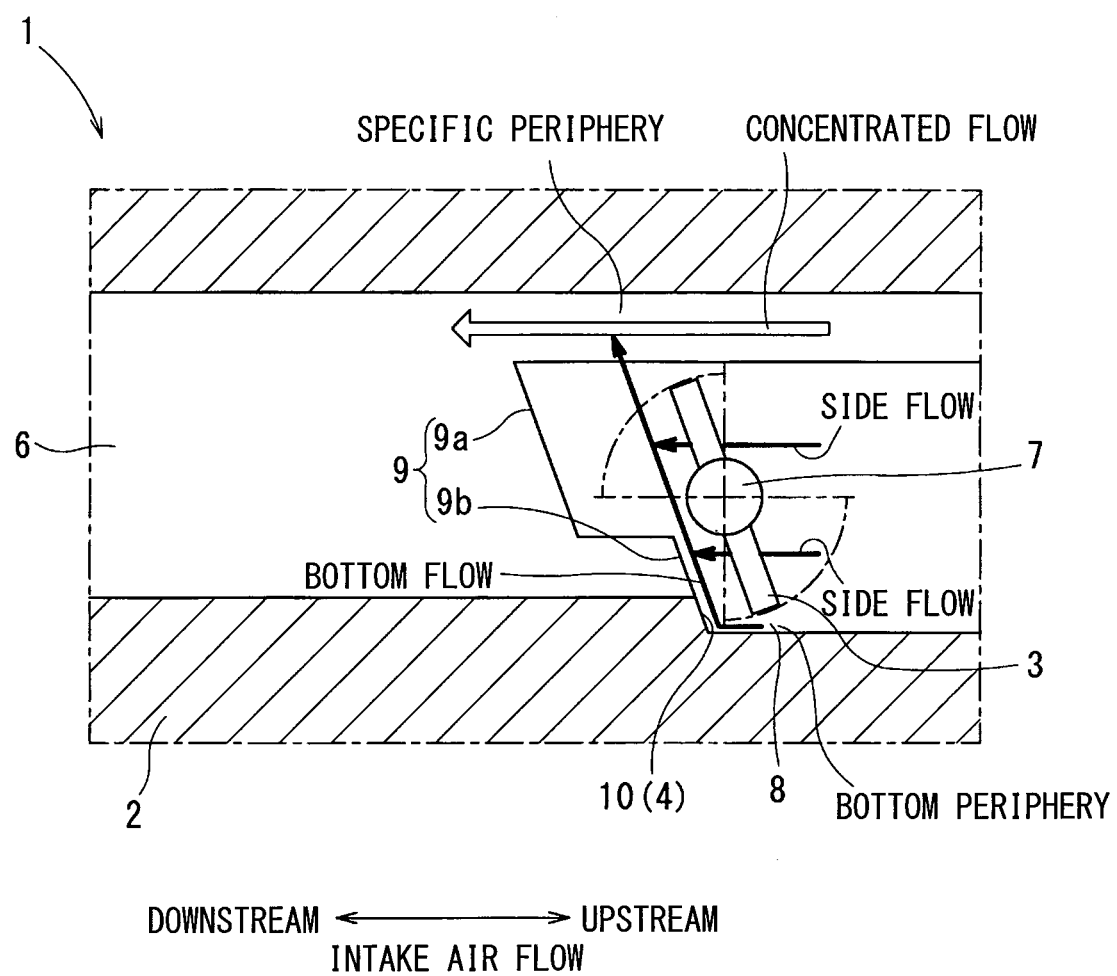
FIG. 5 is a schematic view showing a vortex generator device according to a third embodiment.

As shown in FIG. 5, in the vortex generator device 1 according to the third embodiment, the annular portion 9 has a portion 9b and a portion 9a. The portion 9a is located on the same side as the specific periphery relative to the rotation axis 7. The portion 9b is located on the same side as the bottom periphery relative to the rotation axis 7. When the valve element 3 is at the full-close angle, the portion 9b is closer to the valve element 3 than the portion 9a. The annular portion 9 is seen in an inverted N-shape when being side-viewed. That is, the annular portion 9 is seen, when being side-viewed, in the inverted N-shape including two line segments, which are in parallel with the valve element 3 at the full-close angle, and one line segment, which is in parallel with the passage axis.

The portions 9a and 9b are seen, when being side-viewed, as separated line segments, respectively, which are in parallel with the valve element 3 at the full-close angle. In addition, the line segment corresponding to the portion 9a is seen, when being side-viewed, distant from the valve element 3 at the full-close angle further than the line segment corresponding to the portion 9b. The stepped surface 10 is not entirely in parallel with the valve element 3 at the full-close angle. Portions of the stepped surface 10 corresponding to the portions 9a and 9b are in parallel with the valve element 3 at the full-close angle.

The present configuration increases a flow resistance against the bottom flow passing around the bottom periphery. Simultaneously, the bottom flow is further throttled in the present configuration to increase a flow velocity of the bottom flow. Accordingly, the bottom flow is enabled further to draw the side flows. The present configuration increases a flow resistance against the bottom flow thereby to reduce a flow quantity of the bottom flow. Consequently, a flow quantity of the concentrated flow increases relatively. Accordingly, intake airflow can be further converged to the concentrated flow.

Fourth Embodiment

Figure 6:
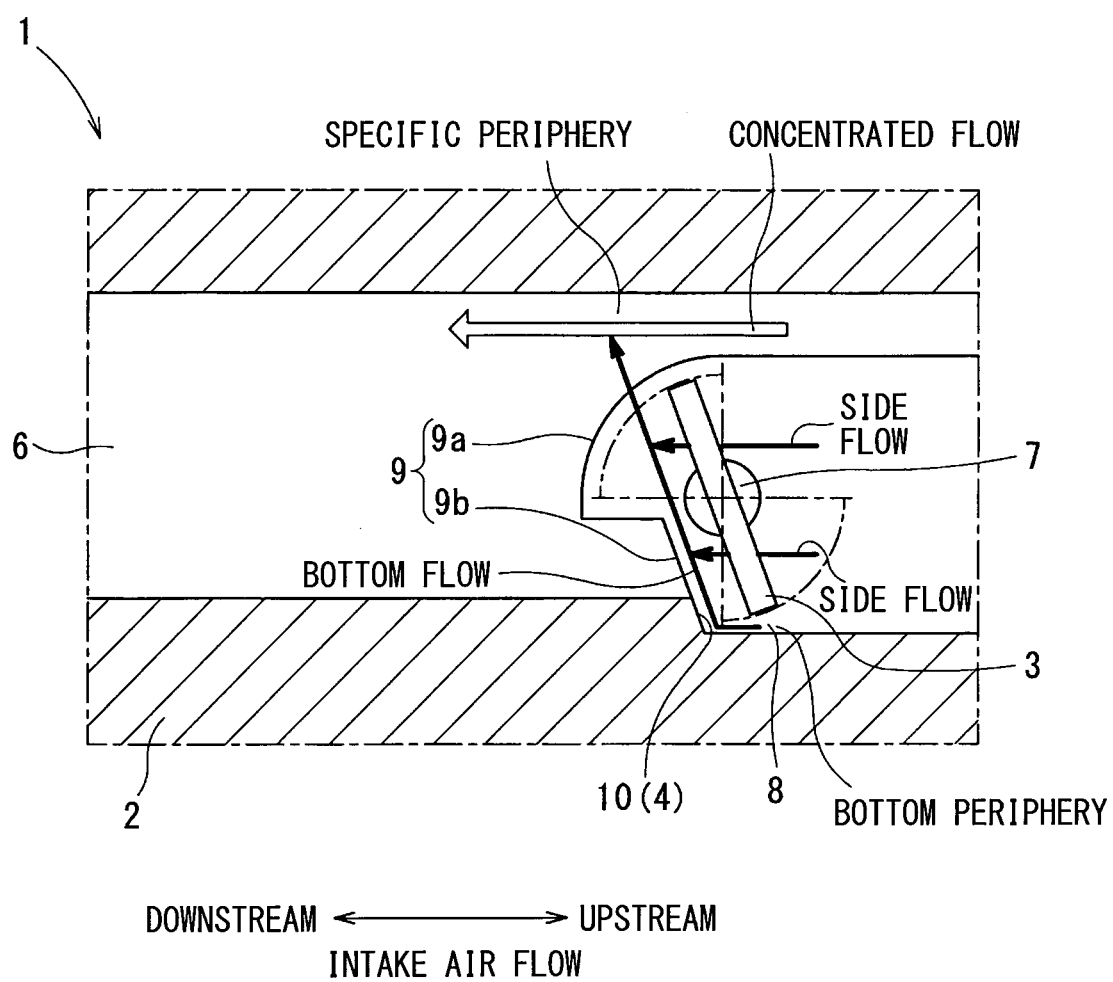
FIG. 6 is a schematic view showing a vortex generator device according to a fourth embodiment.

As shown in FIG. 6, in the vortex generator device 1 according to the fourth embodiment, the portion 9a is, when being side-viewed, seen in an arc-shape, which is substantially in the same shape as the rotation locus of the valve element 3 and extending in an angular range of $\pi/2$. The portion 9a extends substantially along the rotation locus of the valve element 3. The present configuration increases a flow resistance against the side flows around the side peripheries on the same side as the specific periphery. Therefore, a flow quantity of the side flows decreases, and consequently, a flow quantity of the concentrated flow increases relatively. Accordingly, intake airflow can be further converged to the concentrated flow.

Fifth Embodiment

Figure 7:
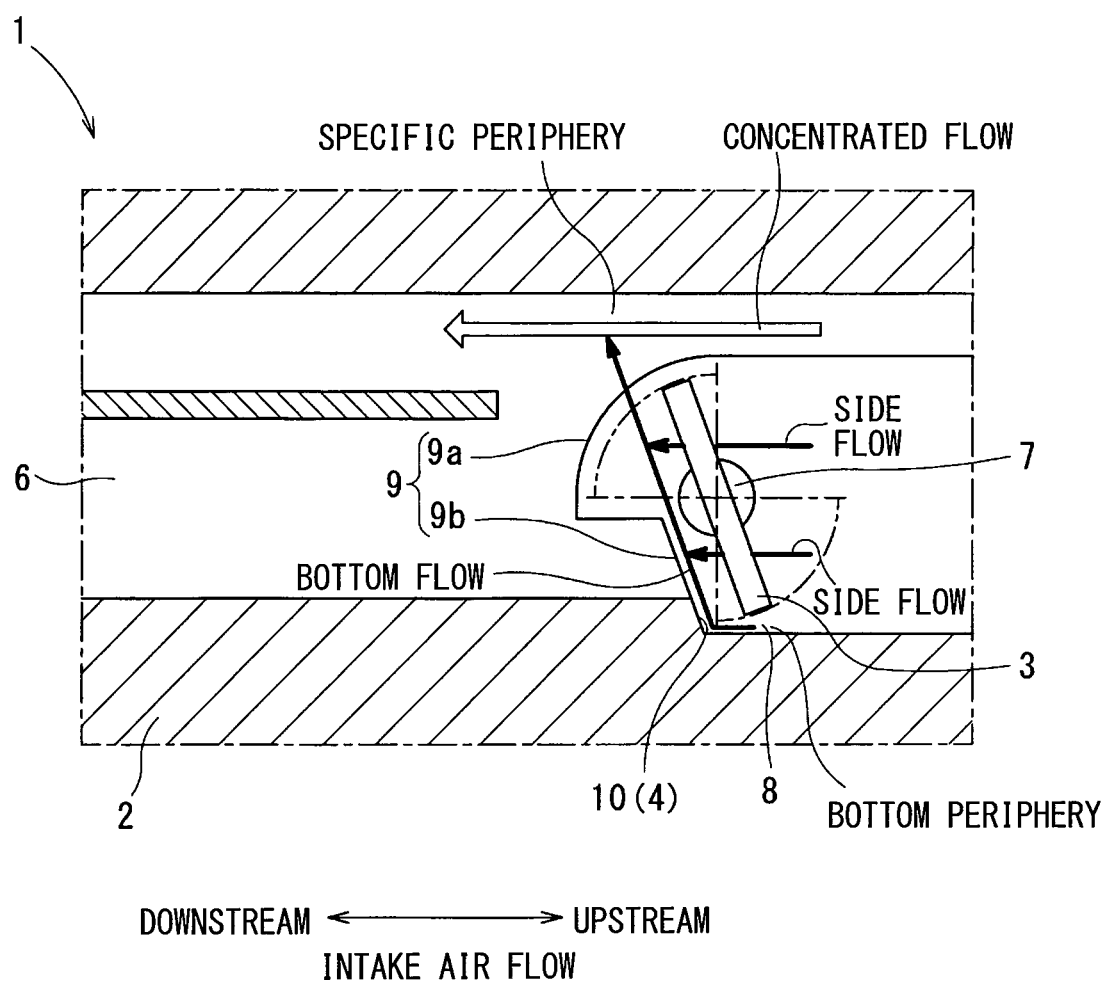
FIG. 7 is a schematic view showing a vortex generator device, in which a butterfly valve is at a full-close angle, according to a fifth embodiment.
Figure 8:
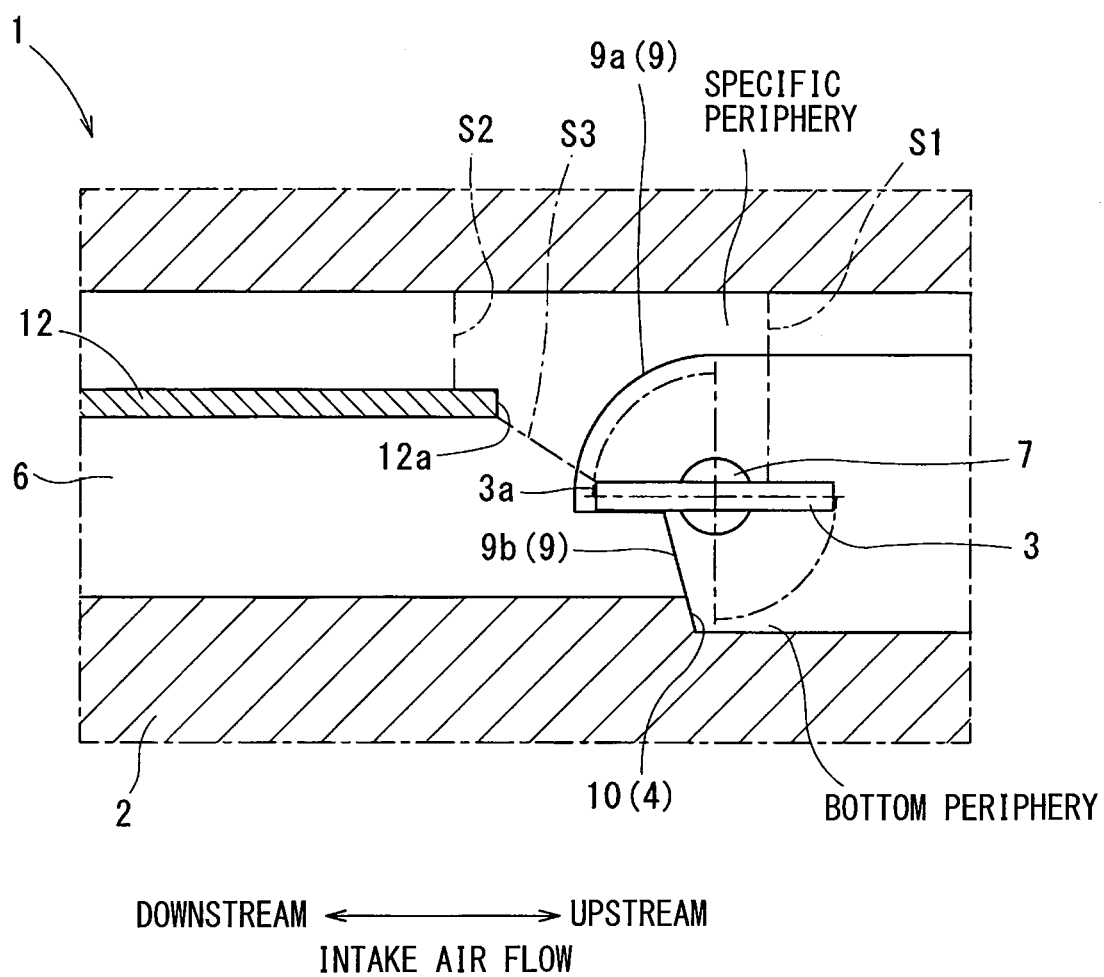
FIG. 8 is a schematic view showing the vortex generator device, in which the butterfly valve is at a full-open angle, according to the fifth embodiment.

As shown in FIGS. 7 and 8, the vortex generator device 1 according to the fifth embodiment has the passage 6 equipped with a partition plate 12 to suppress diffusion of the concentrated flow. The partition plate 12 is located on the same as the specific periphery relative to the rotation axis 7 and is located on the downstream side from the rotation locus of the valve element 3. The present configuration enables to restrict the converged and concentrated flow from diffusing.

Further, as shown in FIG. 8, when the valve element 3 is at the full-open angle, one perimeter of the valve element 3 (downstream perimeter 3a) is located on the downstream side from the rotation axis 7. A positional relation between the downstream perimeter 3a of the valve element 3 and an upstream perimeter 12a of the partition plate 12 is set to satisfy the following relation: $S1 \leq S2+S3$. Herein, S1 represents a crosssectional area of a portion of the cross section of the passage 6, the portion being located on the same side as the specific periphery relative to the rotation axis 7. S2 represents a crosssectional area of the concentrated flow formed by the partition plate 12. S3 represents an area of a region defined between the downstream perimeter 3a and the upstream perimeter 12a.

Figure 9:
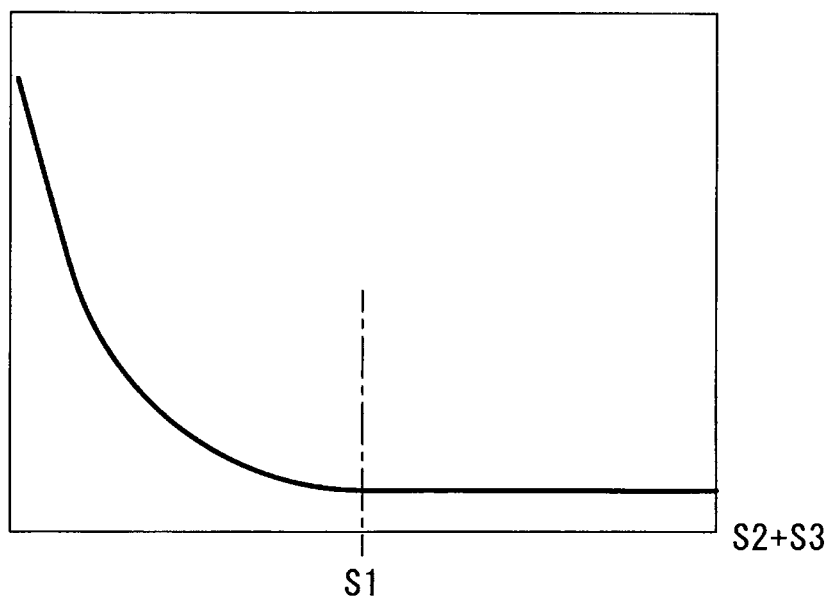
FIG. 9 is a view showing a relation between (S2+S3) and a pressure loss caused in a passage, according to the fifth embodiment.

When the valve element 3 is at the full-open angle, in a case where the downstream perimeter 3a of the valve element 3 is excessively close to the upstream perimeter 12a of the partition plate 12, a flow resistance against intake airflow increases around the center of the passage 6. Consequently, as shown in FIG. 9, a pressure loss caused in the passage 6 increases. In consideration of this, the positional relation of the downstream perimeter 3a and the upstream perimeter 12a is set to satisfy the relation of: $S1 \leq S2+S3$. In this way, excessively close arrangement between the downstream perimeter 3a and the upstream perimeter 12a is avoided. Thus, increase in pressure loss caused in the passage 6 is suppressed. The present configuration enables to secure a flow quantity of intake air when a swirl flow is not generated.

Modification

The vortex generator device 1 is not limited to the first to seventh embodiments and may employ various modifications. The vortex generator device 1 according to the first to seventh embodiments employs the valve element 3 in the rectangular shape. To the contrary, for example, the valve element 3 may be in a disc shape, and the passage 6 may have a circular cross section. In this case, a periphery of the valve element 3 may be partially removed to cause the partially removed periphery to throttle intake airflow.

According to a first aspect of the present disclosure, the vortex generator device includes the butterfly valve and the passage wall step, as described below. The butterfly valve is in the plate shape and is configured to rotate to throttle intake airflow, which is to be drawn into the internal combustion engine, to the specific periphery of the passage cross section. The passage wall step is formed in the passage wall, which forms the passage of intake air. The passage wall step is located on the downstream side from the rotation locus of the butterfly valve relative to intake airflow. The passage wall step has the raised side and the depressed side, which are located on the downstream side and on the upstream side, respectively, relative to intake airflow.

In the present configuration, differently from the concentrated flow, intake air flows through the full-close CL toward the downstream side of the butterfly valve and collides against the stepped surface of the passage wall step to turn its flow direction to be directed from the periphery of the passage toward the center. The passage has the bottom periphery, which is faced to the specific periphery and is located on the opposite side from the specific periphery through the basis of the passage axis. The intake airflow causes the bottom flow passing around the bottom periphery. The passage has the side peripheries other than the specific periphery and the bottom periphery. The intake airflow causes the side flow passing around the side peripheries.

The bottom flow merges with the concentrated flow, while drawing the side flows. In this way, intake airflow is converged into the concentrated flow on the downstream side from the butterfly valve 3. The vortex generator device having the present configuration enables to produce an ideal vortex flow, while restricting a flow velocity of the concentrated flow from decreasing and while restricting the concentrated flow from diffusing, without costly minimization of the full-close CL.

According to a second aspect of the present disclosure, the passage wall step has the annular portion surrounding the axis of the passage. In addition, the annular portion is substantially in parallel with the direction of the surface of the butterfly valve, when the butterfly valve is at the full-close angle at which the butterfly valve throttles intake airflow most toward the specific periphery. The present configuration inclines the side flows to move toward the concentrated flow. Therefore, the present configuration enables further easily to converge intake airflow into the concentrated flow.

According to a third aspect of the present disclosure, the passage wall step has the annular portion surrounding the axis of the passage. In addition, the annular portion includes the first portion and the second portion. The first portion is located on the opposite side from the specific periphery through the rotation axis of the butterfly valve. The second portion is located on the same side as the specific periphery. The first portion is closer to the butterfly valve than the second portion, when the butterfly valve is at the full-close angle at which the butterfly valve throttles intake airflow most toward the specific periphery. The present configuration increases a flow resistance against the bottom flow passing around the bottom periphery. Simultaneously, the bottom flow is further throttled in the present configuration to increase a flow velocity of the bottom flow. Accordingly, the bottom flow is enabled further to draw the side flows. The present configuration increases a flow resistance against the bottom flow thereby to reduce a flow quantity of the bottom flow. Consequently, a flow quantity of the concentrated flow increases relatively. Accordingly, intake airflow can be further converged to the concentrated flow.

According to a fourth aspect of the present disclosure, the passage wall step has the annular portion surrounding the axis of the passage. The annular portion includes the portion on the same side as the specific periphery relative to the rotation axis of the butterfly valve, and the portion is in the shape substantially the same as the shape of the rotation locus of the butterfly valve and substantially being along the rotation locus of the butterfly valve. The present configuration increases a flow resistance against the side flows around the side peripheries on the same side as the specific periphery. Therefore, a flow quantity of the side flows decreases, and consequently, a flow quantity of the concentrated flow increases relatively. Accordingly, intake airflow can be further converged to the concentrated flow.

According to a fifth aspect of the present disclosure, the passage is equipped with the partition plate. The partition plate is located on the same side as the specific periphery relative to the rotation axis of the butterfly valve and is located on the downstream side from the rotation locus of the butterfly valve to restrict intake airflow, which is throttled toward the specific periphery, from diffusing. The present configuration enables to restrict the converged concentrated flow from diffusing.

According to a sixth aspect of the present disclosure, when the butterfly valve is at the full-open angle, at which the butterfly valve throttles intake airflow least, the passage has the portion, which is located on the same side as the specific periphery relative to the rotation axis of the butterfly valve and has the first crosssectional area (S1). The passage further has the portion, which is formed by the partition plate to have the second crosssectional area (S2) and to flow intake air throttled to the specific periphery. When the butterfly valve is at the full-open angle, the passage has the region, which is between the perimeter of the butterfly valve located on the downstream side from the rotation axis and the upstream perimeter of the partition plate, having the third area (S3). The first crosssectional area (S1) is less than the sum of the crosssectional second area (S2) and the third area (S3).

In a configuration, in which the perimeter of the butterfly valve on the downstream side is excessively close to the upstream perimeter of the partition plate when the valve element is at the full-open angle, a flow resistance against intake airflow around the center of the passage may excessively increase. Consequently, the passage may cause an excessively large pressure loss. In consideration of this, according to the present configuration, the relation of the position of the perimeter of the butterfly valve on the downstream side and the position of the upstream perimeter of the partition plate are set to satisfy the relation of: $S1 \le S2+S3$. In this way, the perimeter of the butterfly valve on the downstream side is restricted from being excessively close to the upstream perimeter of the partition plate. Thus, the passage is restricted from causing increase in a pressure loss. The present configuration enables to secure a flow quantity of intake air when a swirl flow is not generated.

It should be appreciated that while the processes of the embodiments of the present disclosure have been described herein as including a specific sequence of steps, further alternative embodiments including various other sequences of these steps and/or additional steps not disclosed herein are intended to be within the steps of the present disclosure.

While the present disclosure has been described with reference to preferred embodiments thereof, it is to be understood that the disclosure is not limited to the preferred embodiments and constructions. The present disclosure is intended to cover various modification and equivalent arrangements. In addition, while the various combinations and configurations, which are preferred, other combinations and configurations, including more, less or only a single element, are also within the spirit and scope of the present disclosure.

What is claimed is:

1. A vortex generator device comprising:
   a butterfly valve in a plate shape, the butterfly valve configured to rotate to throttle an intake airflow, which is to be drawn into an internal combustion engine, toward a specific periphery in a passage cross section of a passage of intake air; and
   a passage wall step formed in a passage wall, which defines the passage, wherein
   the passage wall step is located on a downstream side from a rotation locus of the butterfly valve relative to intake airflow, and
   the passage wall step has a raised side and a depressed side, which are located on a downstream side and on an upstream side, respectively, relative to intake airflow,
   the passage cross section is in a rectangular shape and has a bottom periphery and two side peripheries other than the specific periphery,
   the bottom periphery is located on an opposite side of a passage axis of the passage from the specific periphery,
   the two side peripheries are other than the specific periphery and the bottom periphery, and
   the passage wall step extends continually through the bottom periphery and the two side peripheries.

2. The vortex generator device according to claim 1, wherein
   the passage wall step has a first portion, which is in the bottom periphery, and second portions, which are in the side peripheries and located on a side of the bottom periphery, and
   the first portion and the second portions are inclined relative to the passage axis of the passage.

3. The vortex generator device according to claim 1, wherein
   the passage wall step has a first portion, which is in the bottom periphery, and second portions, which are in the side peripheries and located on a side of the bottom periphery, and the first portion and the second portions are inclined relative to the passage axis of the passage, such that the first portion and the second portions on a side closer to the specific periphery are located on a downstream side of intake airflow.

4. The vortex generator device according to claim 1, wherein
the passage wall step has a first portion, which is in the bottom periphery, and second portions, which are in the side peripheries and located on a side of the bottom periphery, and
the first portion and the second portions are inclined at a same angle relative to the passage axis of the passage to form a singular flat plane.

5. The vortex generator device according to claim 1, wherein
the passage has a partition plate, and
the partition plate is located on a same side as the specific periphery relative to a rotation axis of the butterfly valve and is located on a downstream side from the rotation locus of the butterfly valve to restrict intake airflow, which is throttled toward the specific periphery, from diffusing.

6. The vortex generator device according to claim 5, wherein
when the butterfly valve is at a full-open angle, at which the butterfly valve throttles intake airflow least,
the passage has a first portion located on a same side as the specific periphery relative to the rotation axis of the butterfly valve, the first portion having a first crossectional area,
the passage has a second portion formed by the partition plate to flow intake air throttled to the specific periphery, the second portion having a second crossectional area,
the passage has a region, which is between a perimeter of the butterfly valve located on a downstream side from the rotation axis and an upstream perimeter of the partition plate, the region having a third area, and
the first crossectional area is less than a sum of the second crossectional area and the third area.

* * * * *